US007397619B2

(12) United States Patent
Hwang et al.

(10) Patent No.: US 7,397,619 B2
(45) Date of Patent: Jul. 8, 2008

(54) PRISM SHEET HAVING CONCAVE PENTAGONAL

(75) Inventors: Jang-Hwan Hwang, Daejeon (KR); Chong-Pil Pae, Suwon (KR); Min-Cheol Kook, Yongin (KR)

(73) Assignee: Doosan Corporation, Seoul (KR)

( * ) Notice: Subject to any disclaimer, the term of this patent is extended or adjusted under 35 U.S.C. 154(b) by 82 days.

(21) Appl. No.: 10/566,443

(22) PCT Filed: Jul. 30, 2004

(86) PCT No.: PCT/KR2004/001933

§ 371 (c)(1), (2), (4) Date: Nov. 16, 2006

(87) PCT Pub. No.: WO2005/012988

PCT Pub. Date: Feb. 10, 2005

(65) Prior Publication Data

US 2007/0115570 A1 May 24, 2007

(30) Foreign Application Priority Data

Jul. 31, 2003 (KR) ...................... 10-2003-0053131
Feb. 9, 2004 (KR) ...................... 10-2004-0008419

(51) Int. Cl.
*G02B 5/04* (2006.01)

(52) U.S. Cl. ....................................... 359/833; 349/112

(58) Field of Classification Search ......... 359/831–837; 349/65, 112
See application file for complete search history.

(56) References Cited

U.S. PATENT DOCUMENTS

2003/0234900 A1* 12/2003 Kim ........................... 349/112

FOREIGN PATENT DOCUMENTS

JP 07-239472 A 9/1995
JP 08-254606 A 10/1996
JP 09-005505 A 1/1997
KR 2003-0096509 A 12/2003

* cited by examiner

*Primary Examiner*—Euncha P Cherry
(74) *Attorney, Agent, or Firm*—Rothwell, Figg, Ernst & Manbeck, P.C.

(57) ABSTRACT

A prism sheet having a concave pentagonal structure is disclosed. The prism sheet comprises a base layer, and a prism array disposed on and supported by the base layer. The prism array is composed of a plurality of prisms aligned in parallel and one beside the other. The transversal cross-section of each prism has a shape of concave pentagon, which is symmetrical about a vertical line passing the apex. The interior angle $\alpha$ of the apex is $30° \leqq \alpha \leqq 120°$, the exterior angle $\beta$ formed by the upper slant side and the lower slant side is $\beta < 180°$, the interior angle $\gamma$ of the lower vertex formed by the lower slant side and the base is $5° \leqq \gamma \leqq 85°$ and the length w of the base is $30\ \mu m \leqq w \leqq 100\ \mu m$. Preferably, the interior angle $\alpha$ of the apex may be $40° \leqq \alpha \leqq 100°$, the exterior angle $\beta$ formed by the upper slant side and the lower slant side may be $160° \leqq \beta \leqq 179°$, and the interior angle $\gamma$ of the lower vertex formed by the lower slant side and the base may be $30° \leqq \gamma \leqq 60°$. Preferably, the length w of the base may be $40\ \mu m \leqq w \leqq 60\ \mu m$.

7 Claims, 20 Drawing Sheets

[FIG. 1]
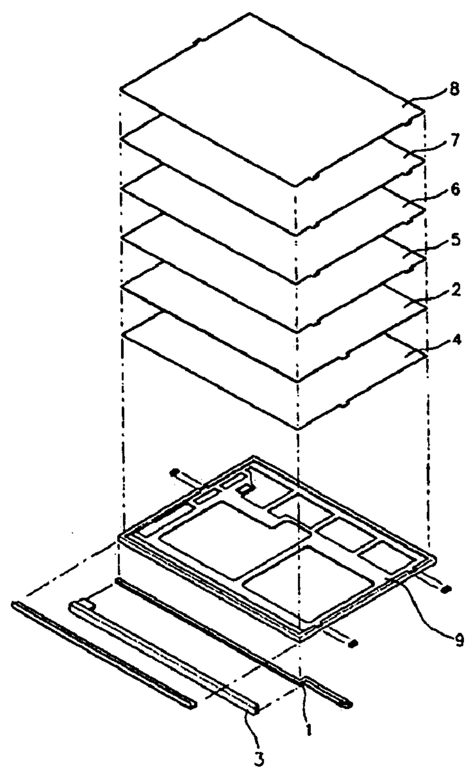
[FIG. 2]
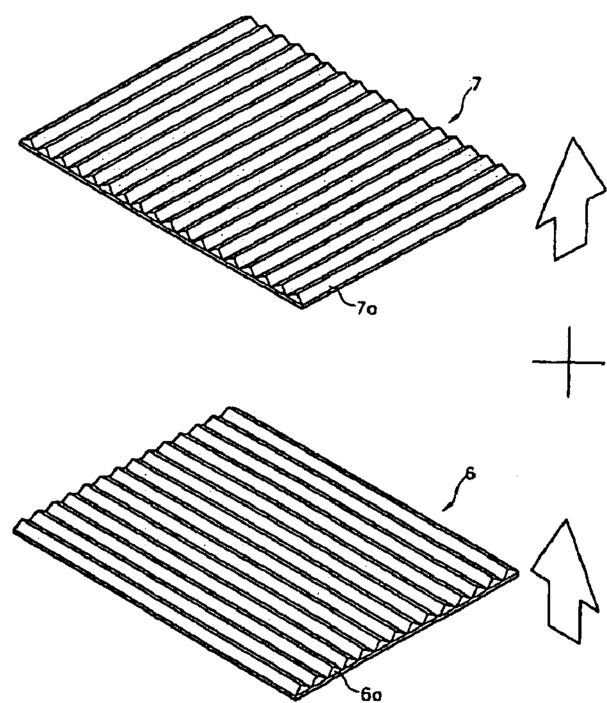

[FIG. 3]
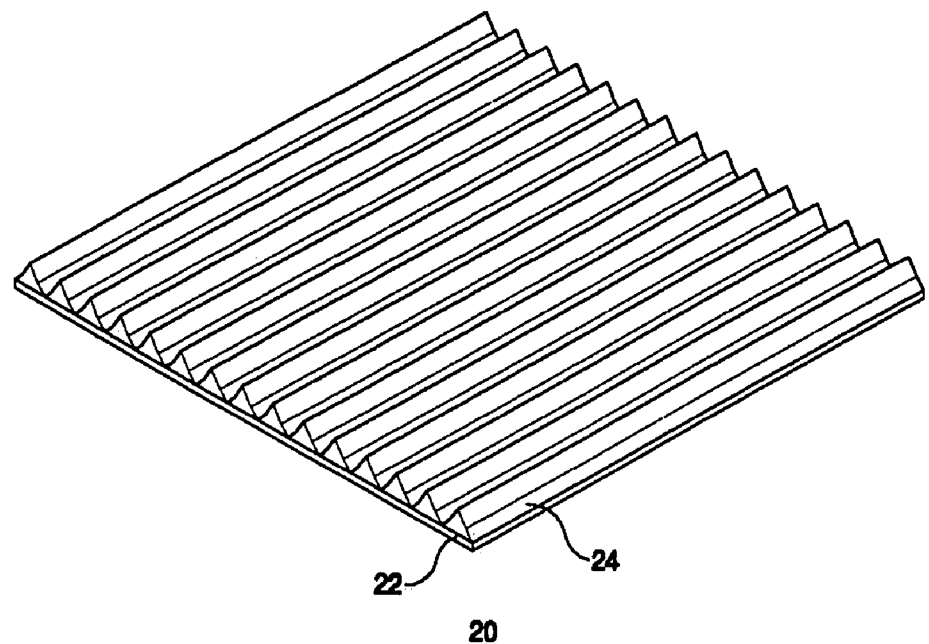
[FIG. 4]
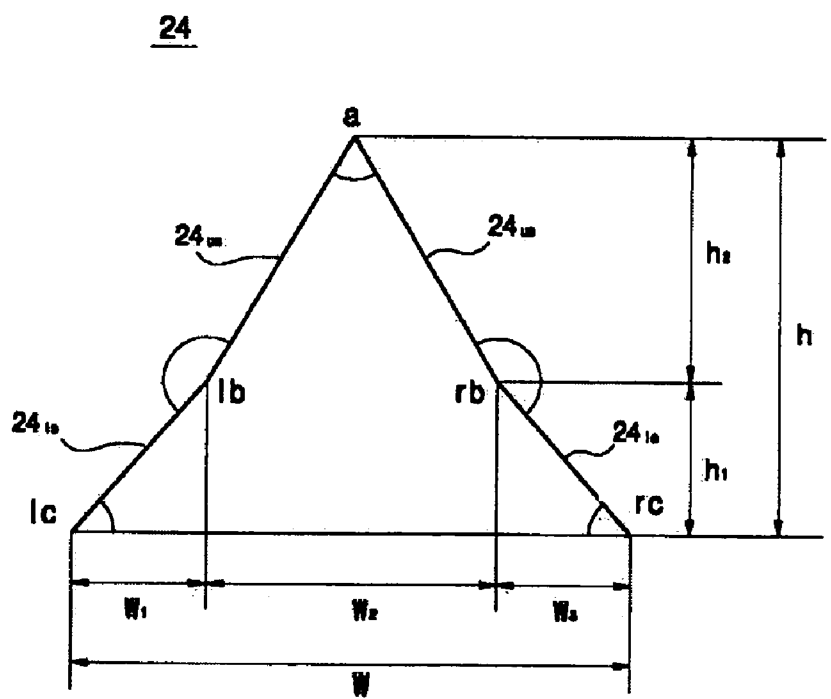

[FIG. 5]
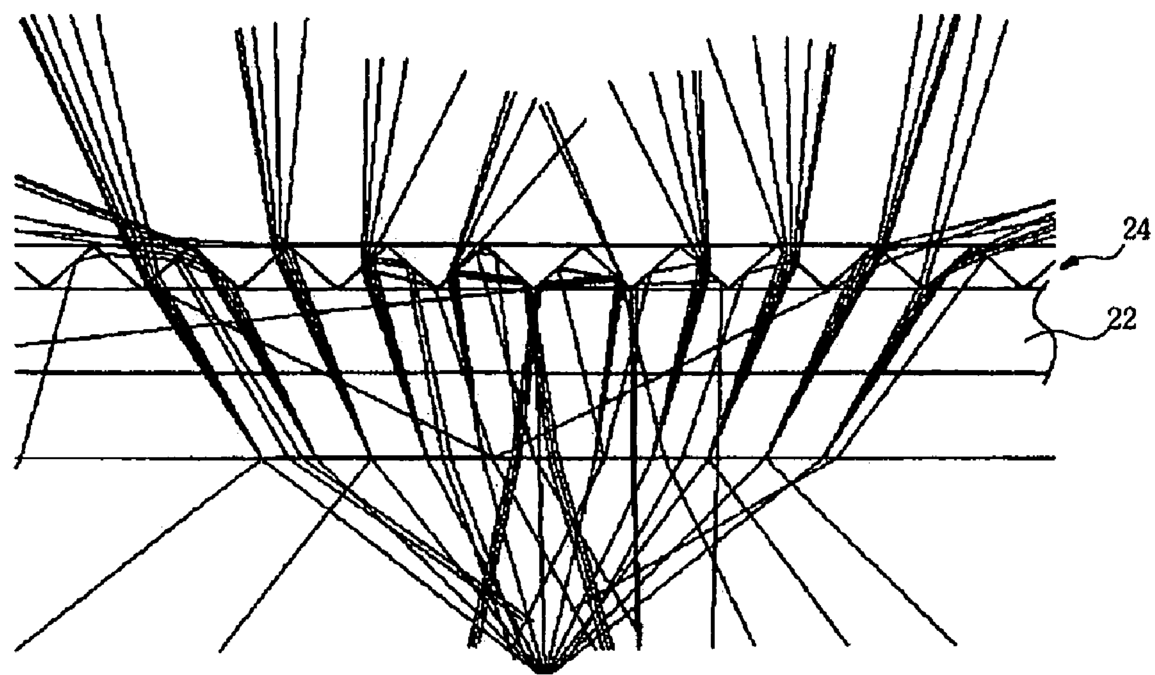

[FIG. 6a]
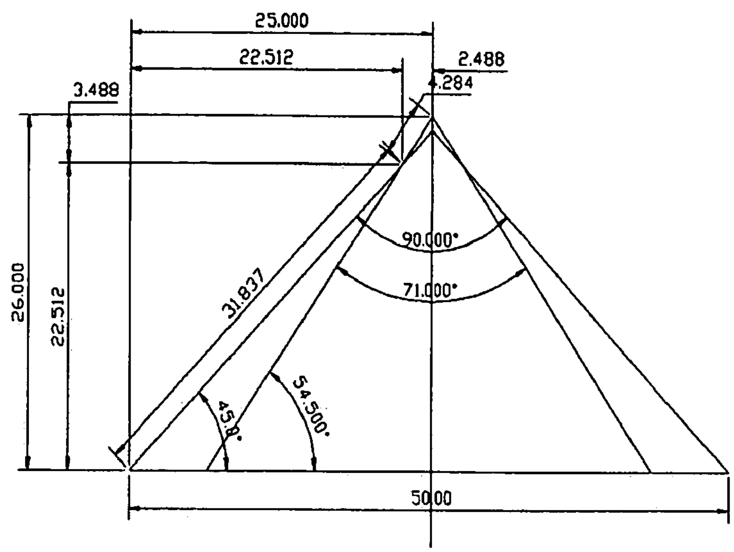
[FIG. 6b]
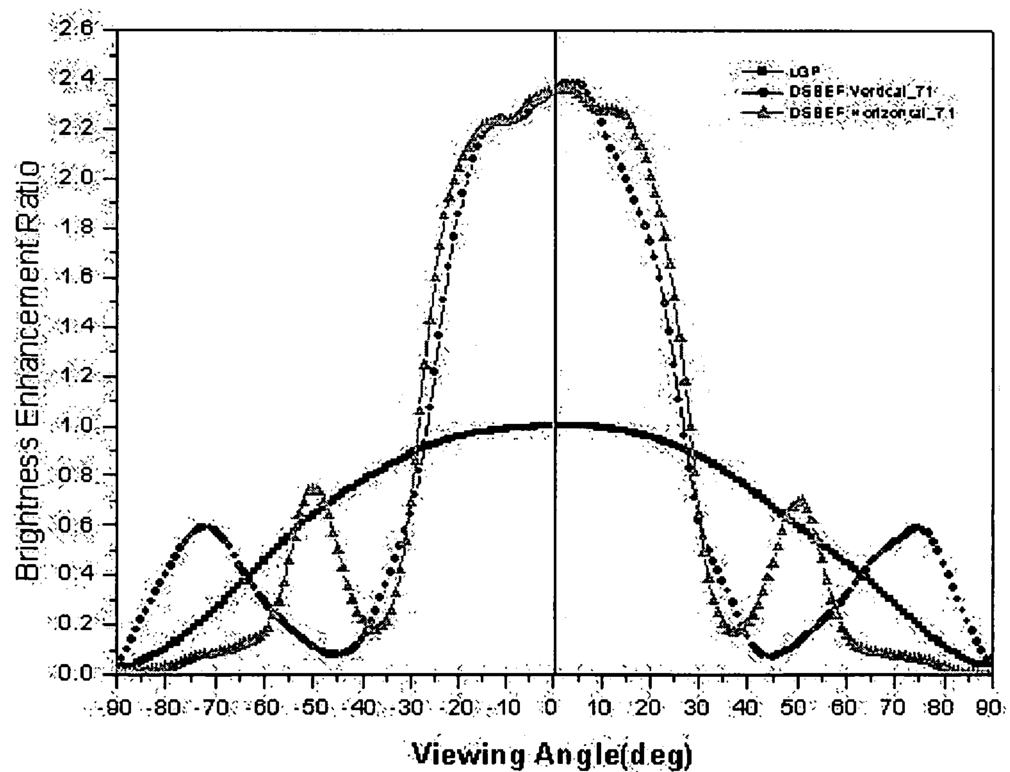

[FIG. 7a]
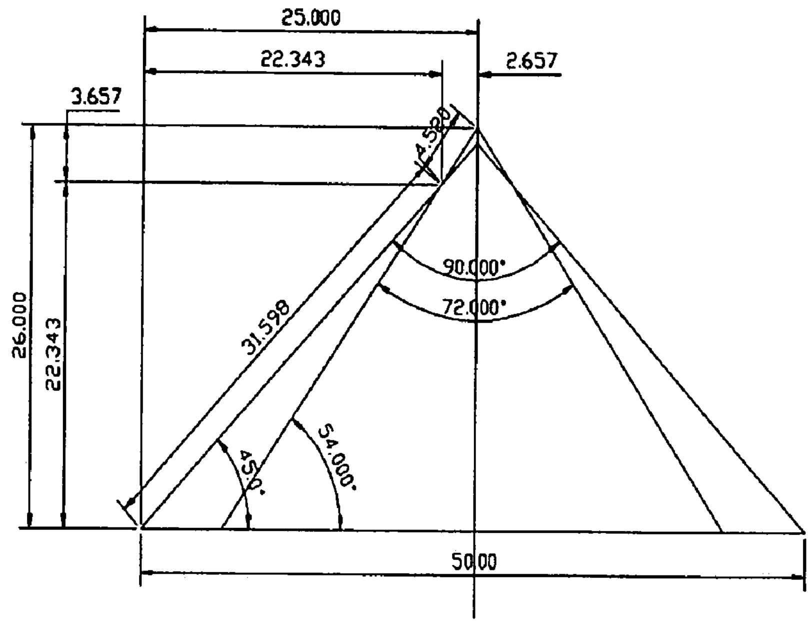
[FIG. 7b]
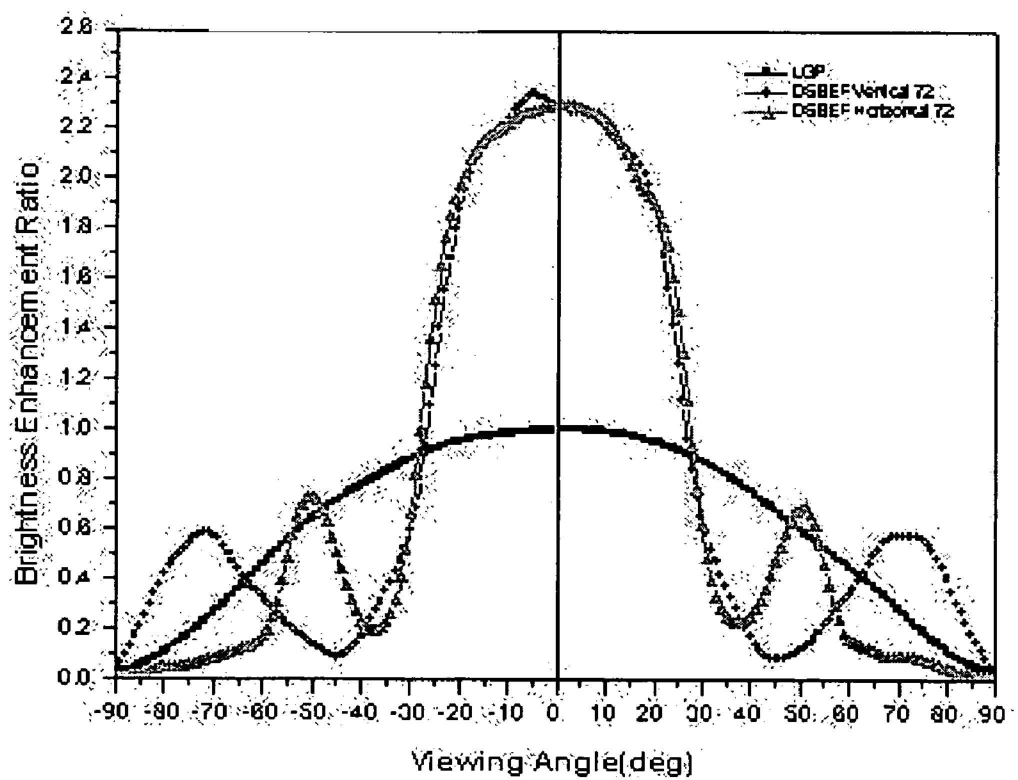

[FIG. 8a]
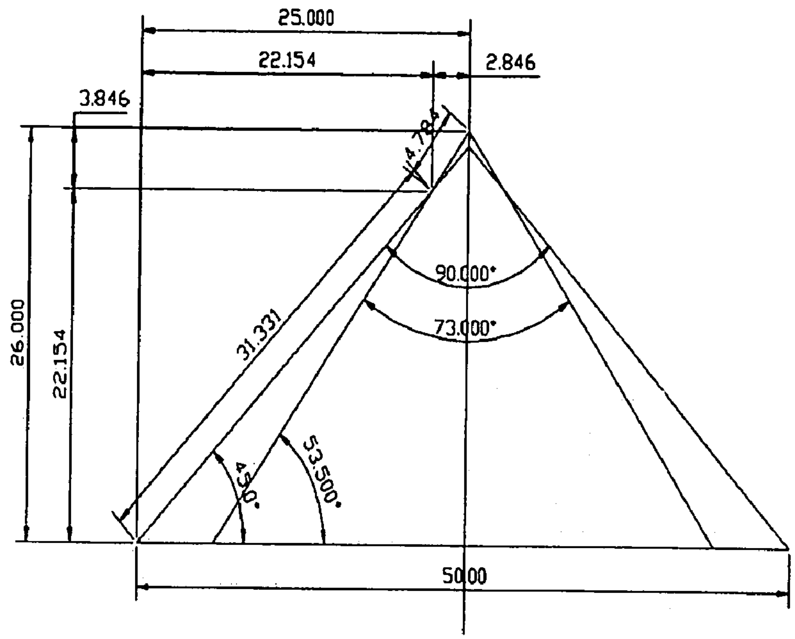
[FIG. 8b]
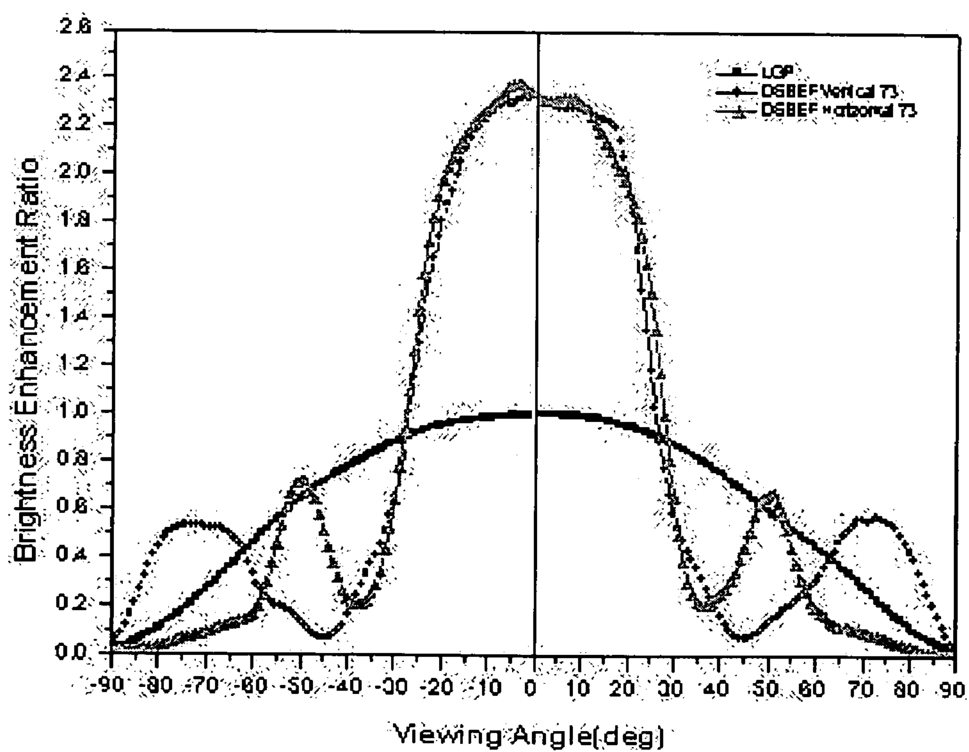

[FIG. 9a]
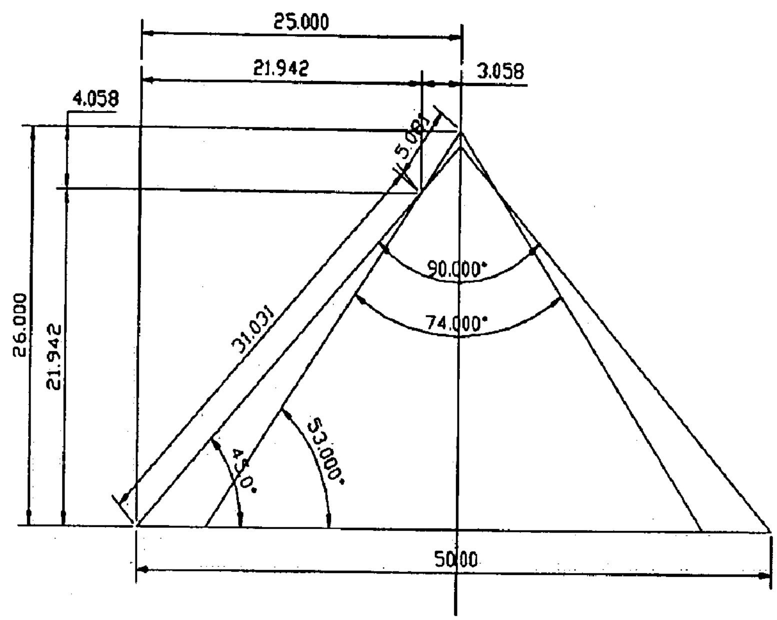
[FIG. 9b]
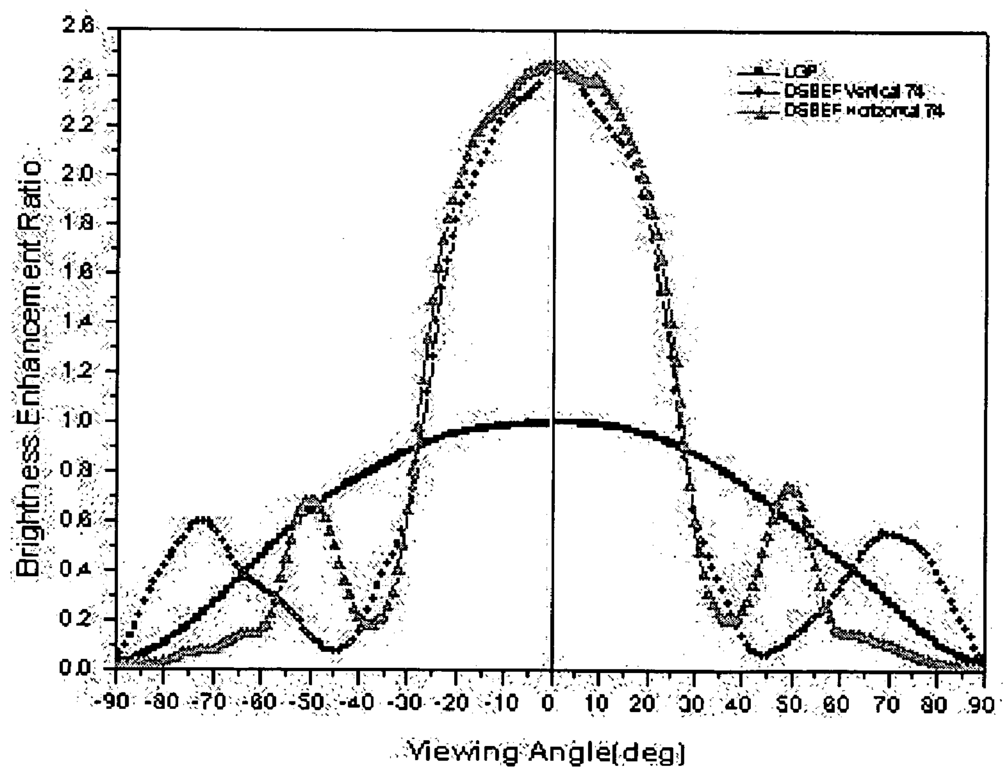

[FIG. 10a]
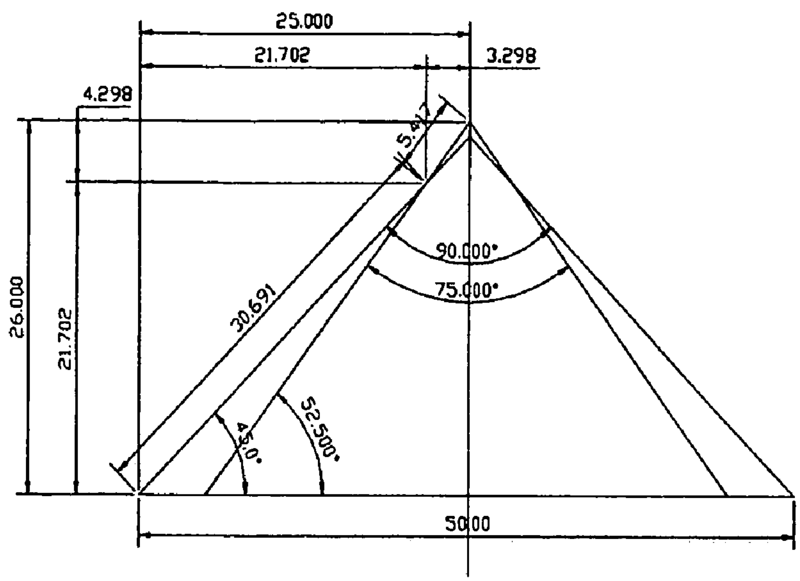
[FIG. 10b]
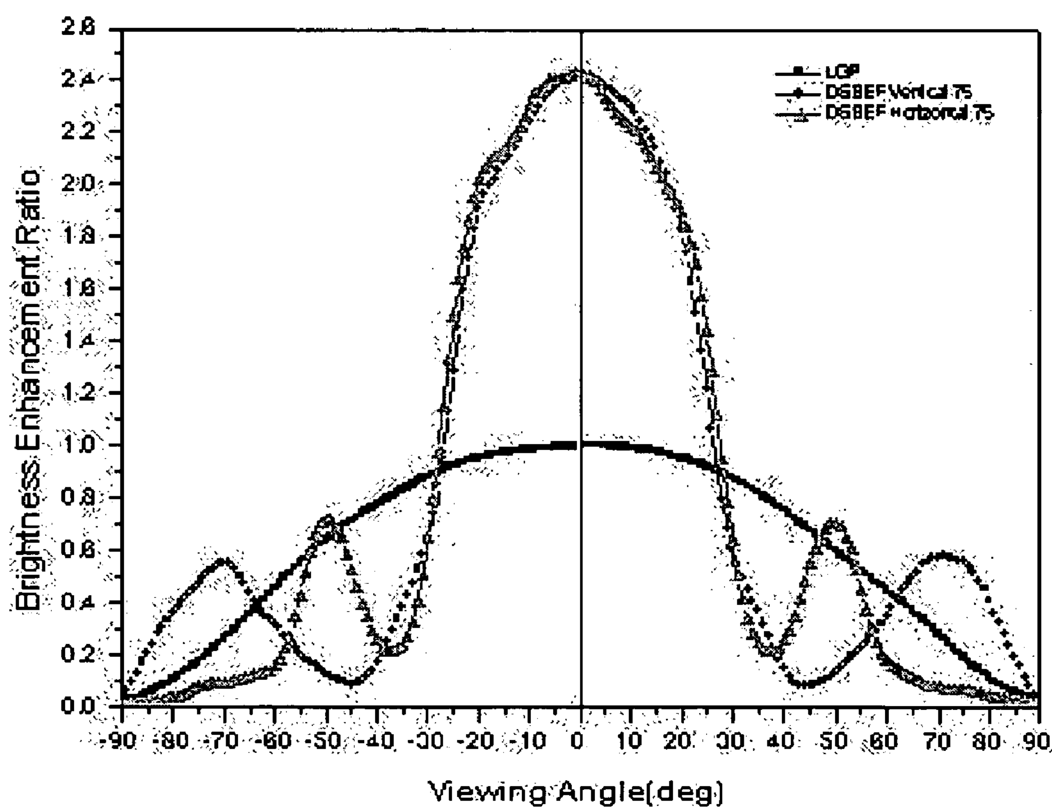

[FIG. 11a]
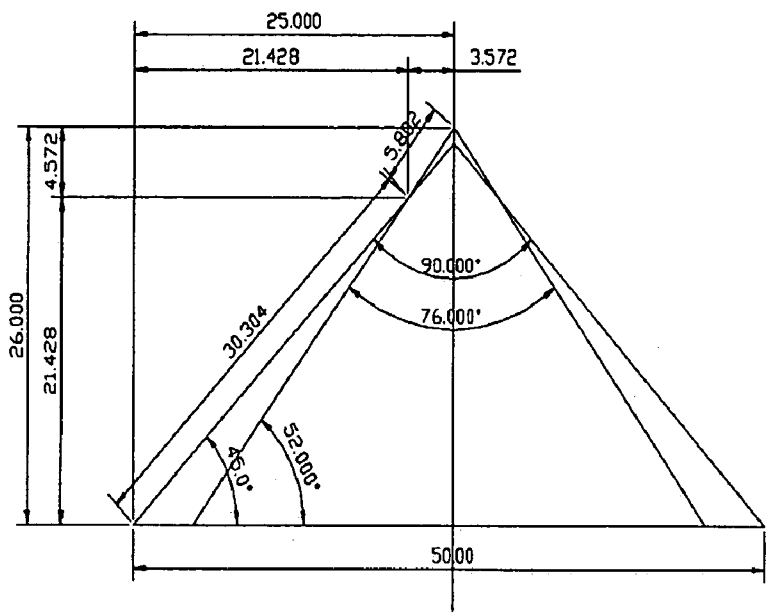
[FIG. 11b]
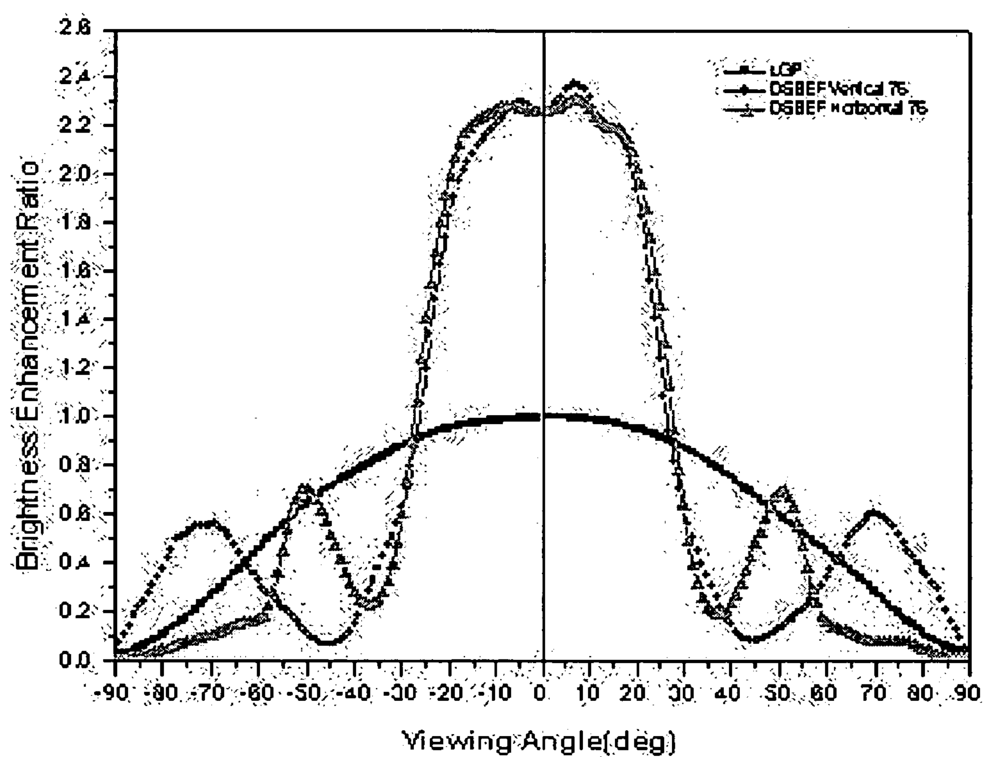

[FIG. 12a]
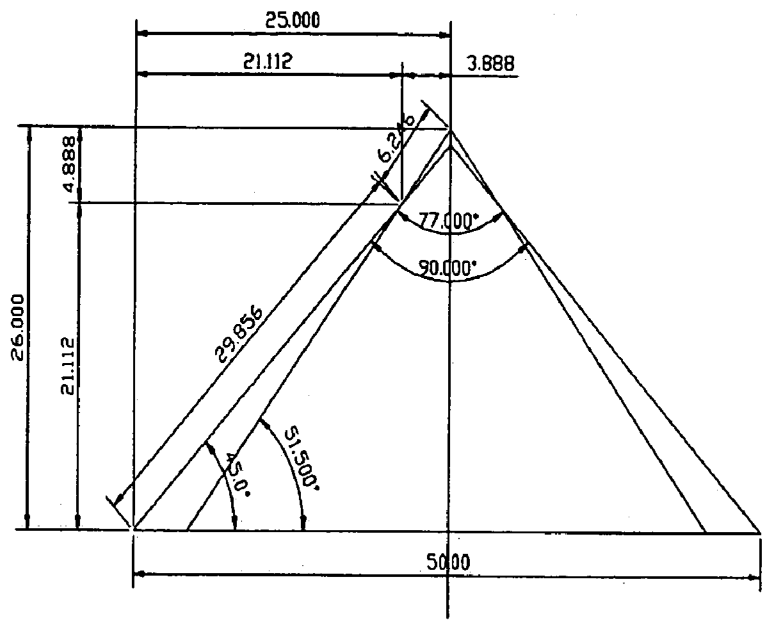
[FIG. 12b]
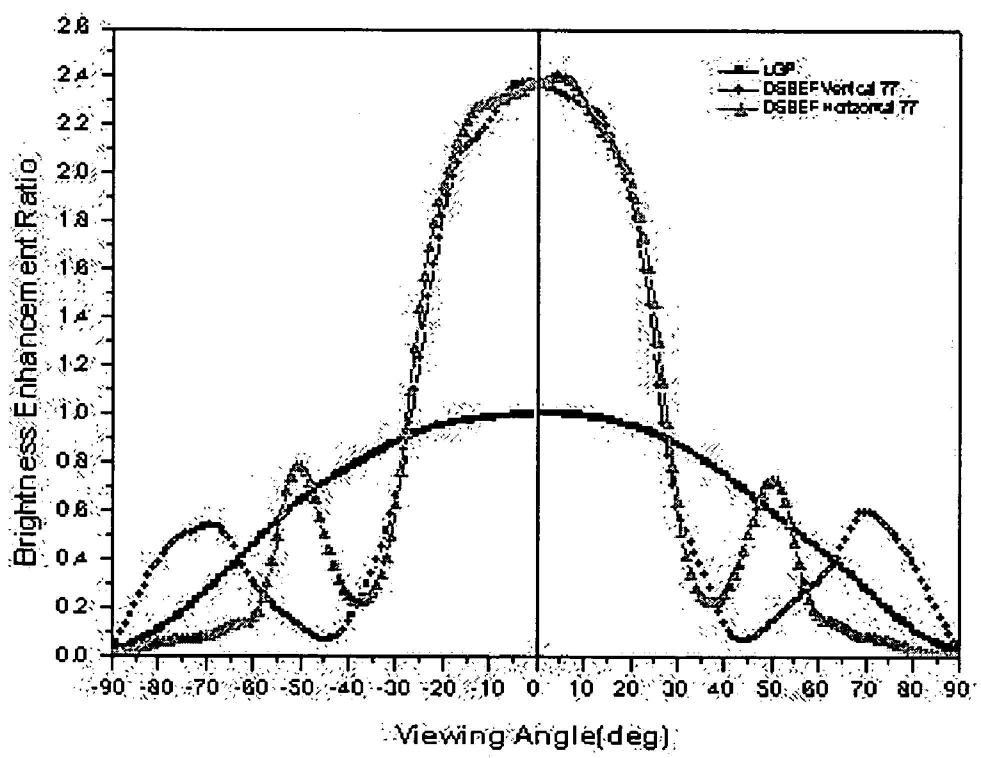

[FIG. 13a]
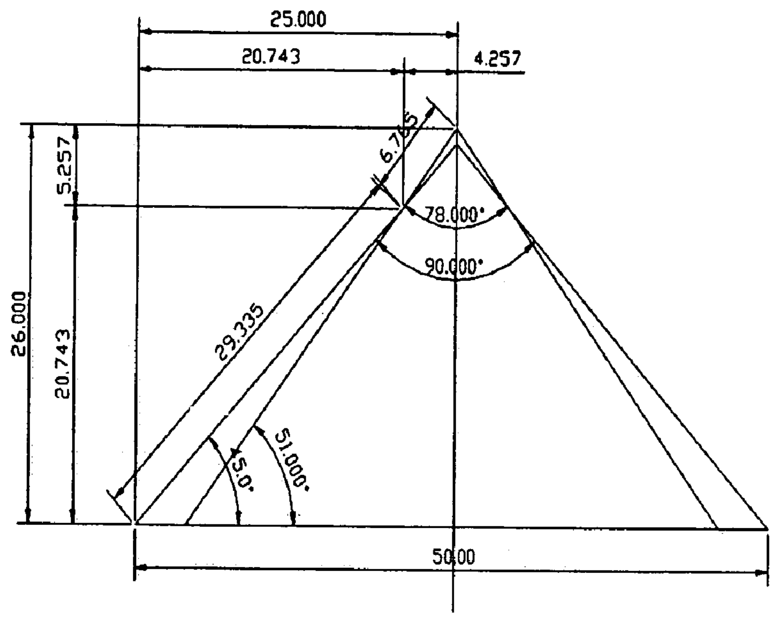
[FIG. 13b]
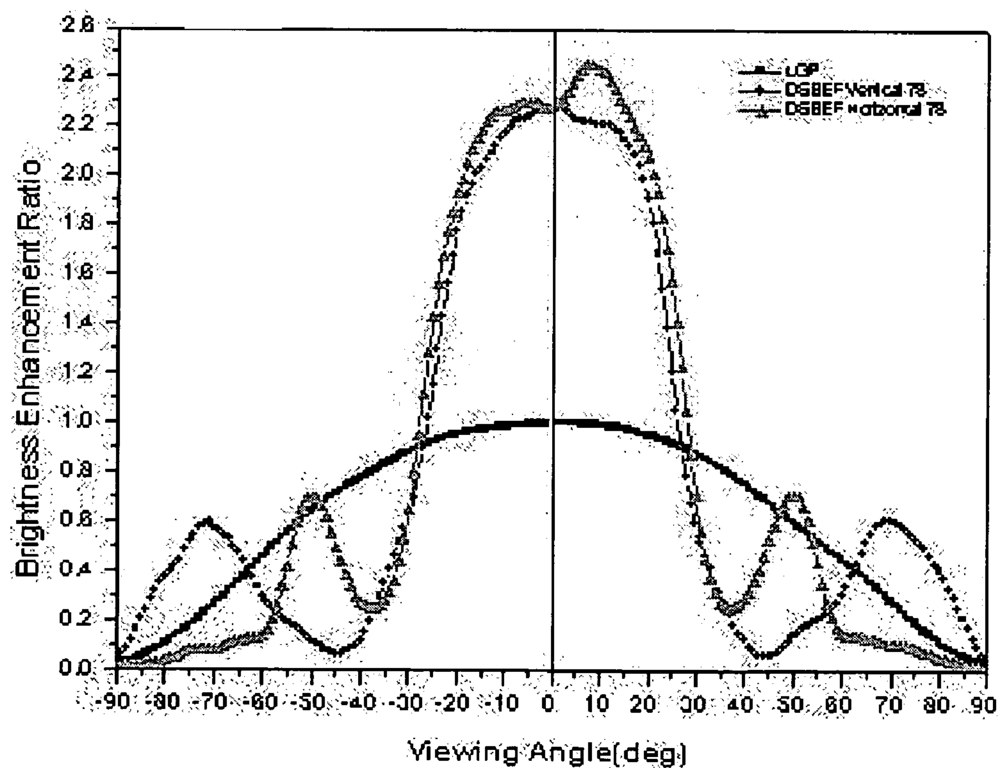

[FIG. 14a]
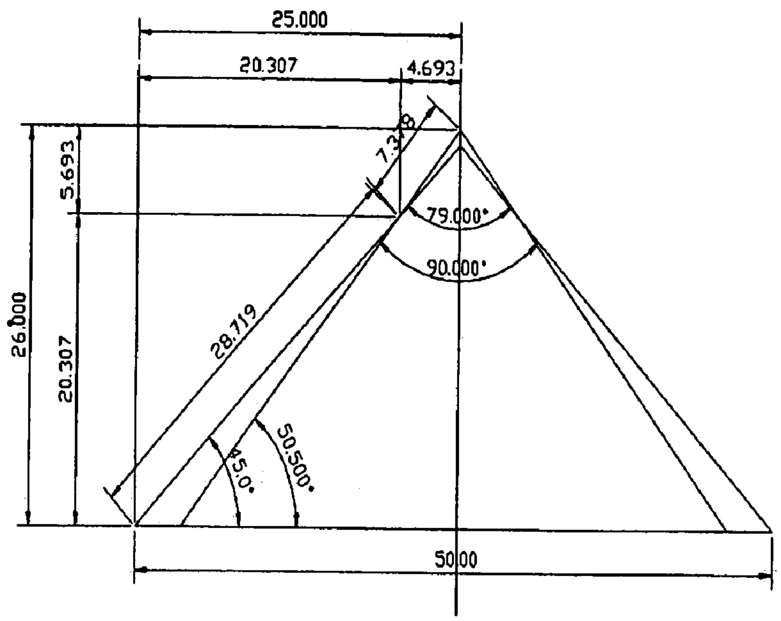
[FIG. 14b]
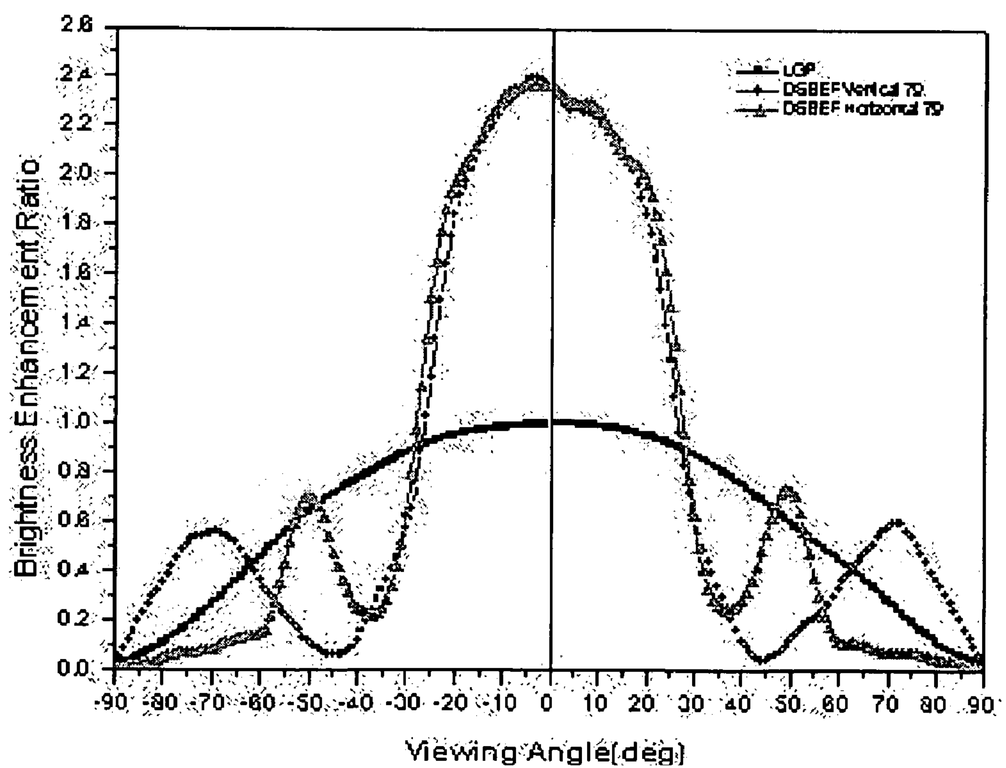

[FIG. 15a]
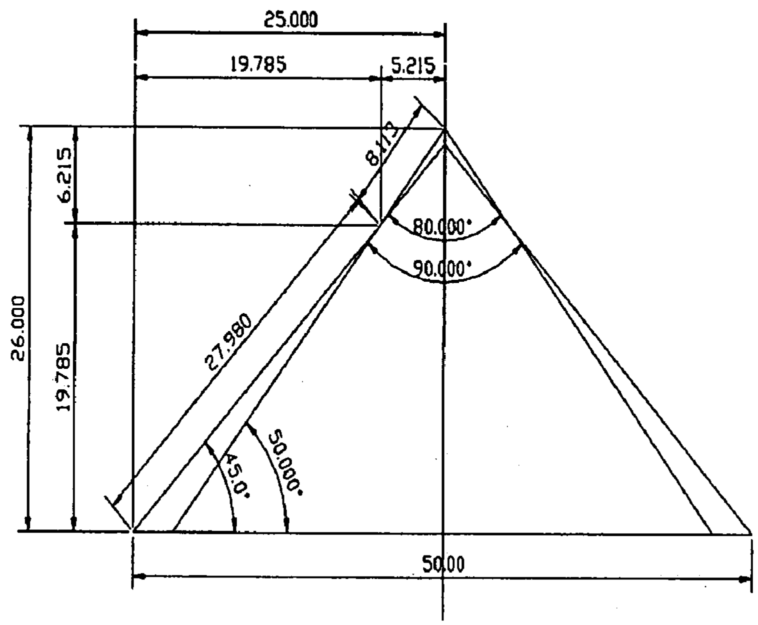
[FIG. 15b]
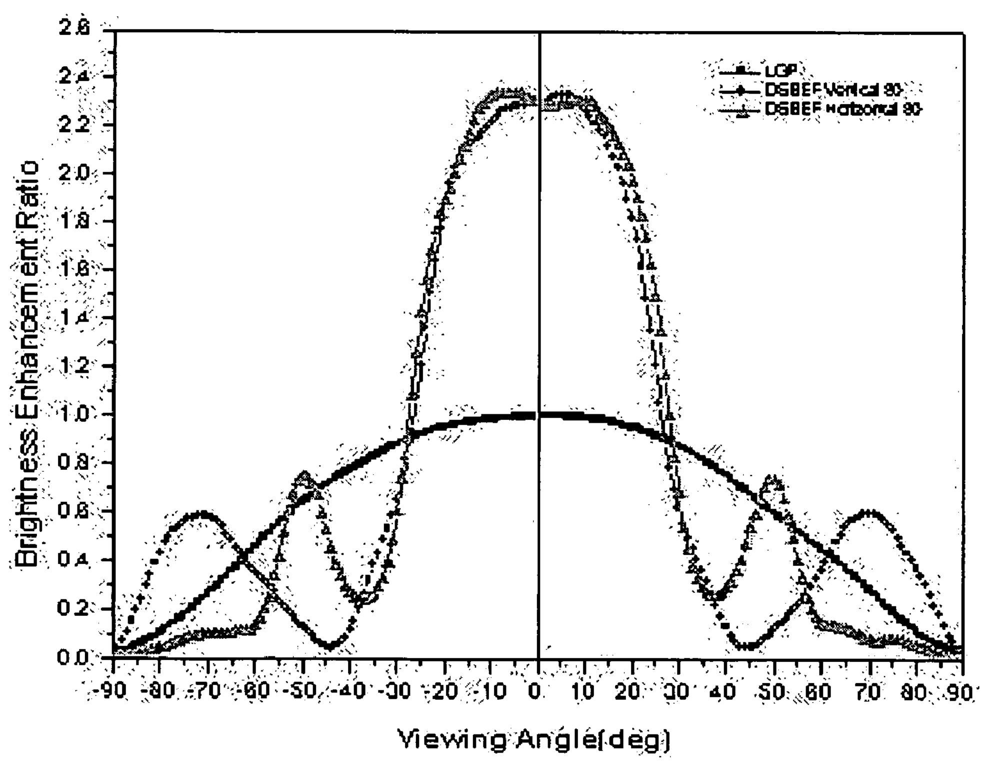

[FIG. 16a]
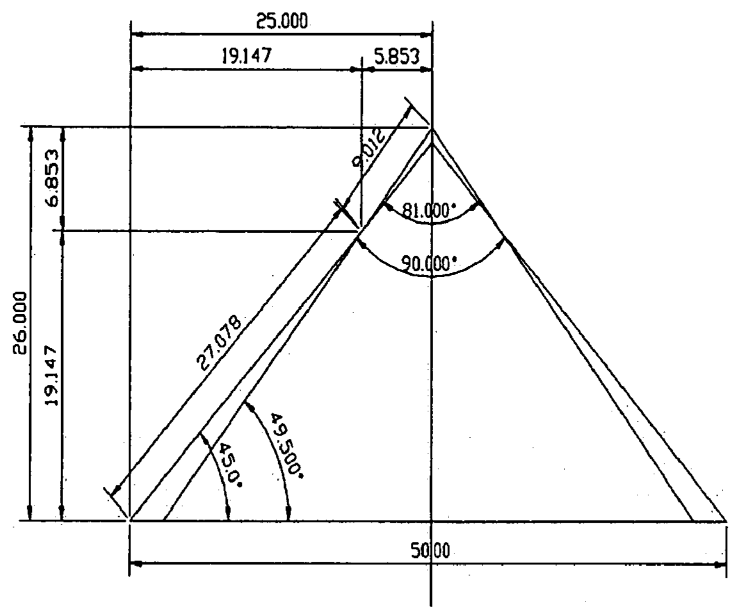
[FIG. 16b]
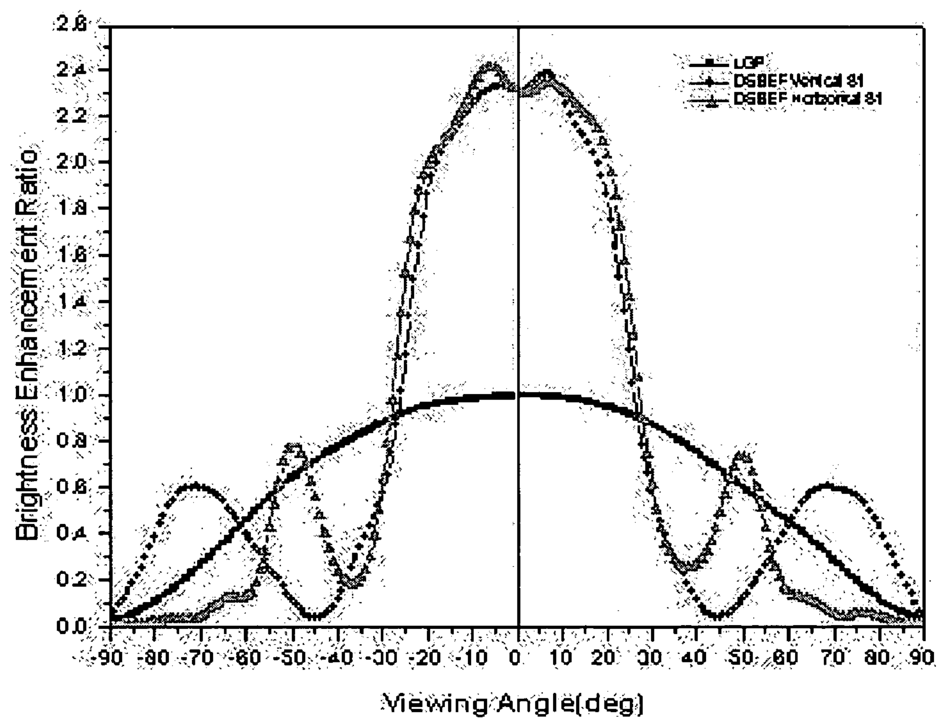

[FIG. 17a]
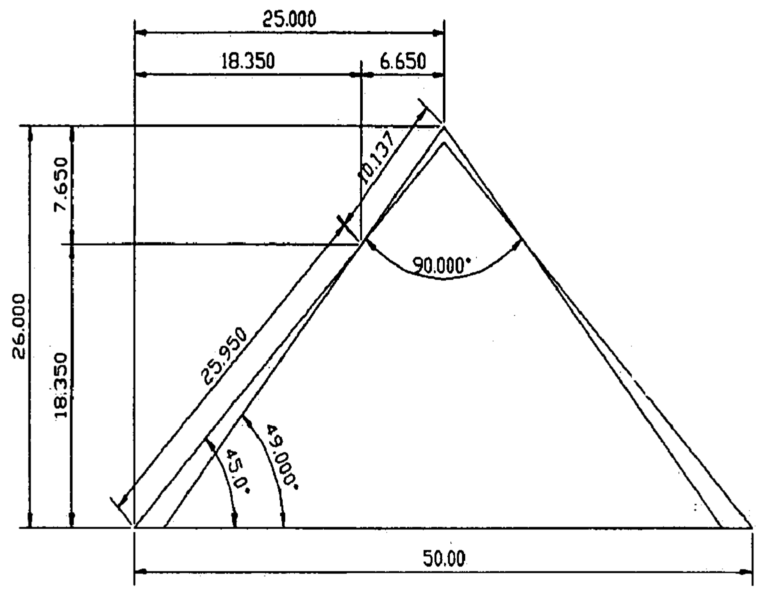
[FIG. 17b]
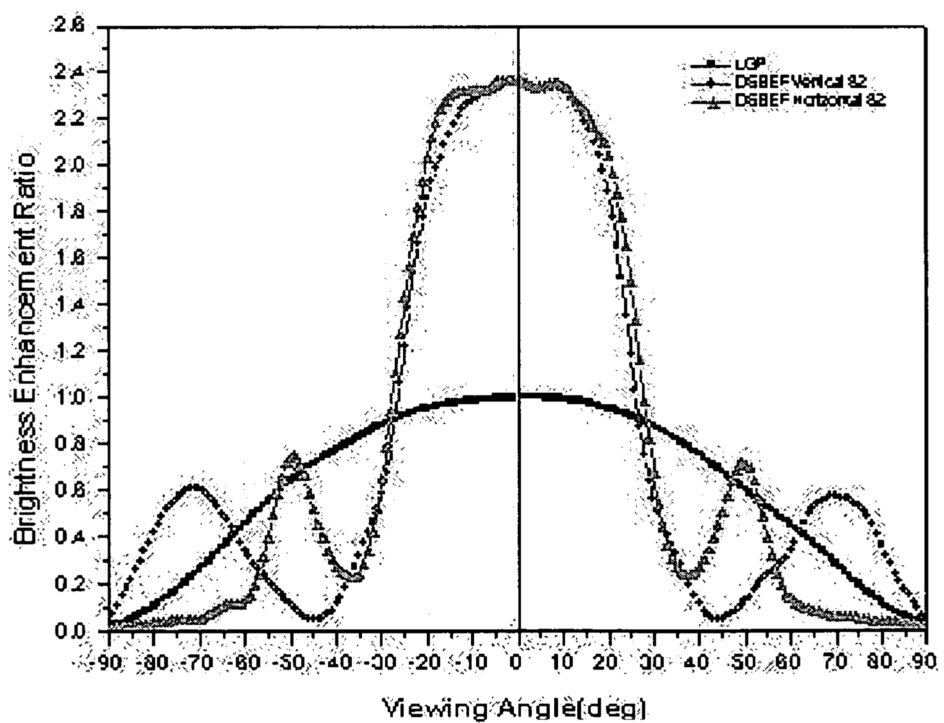

[FIG. 18a]
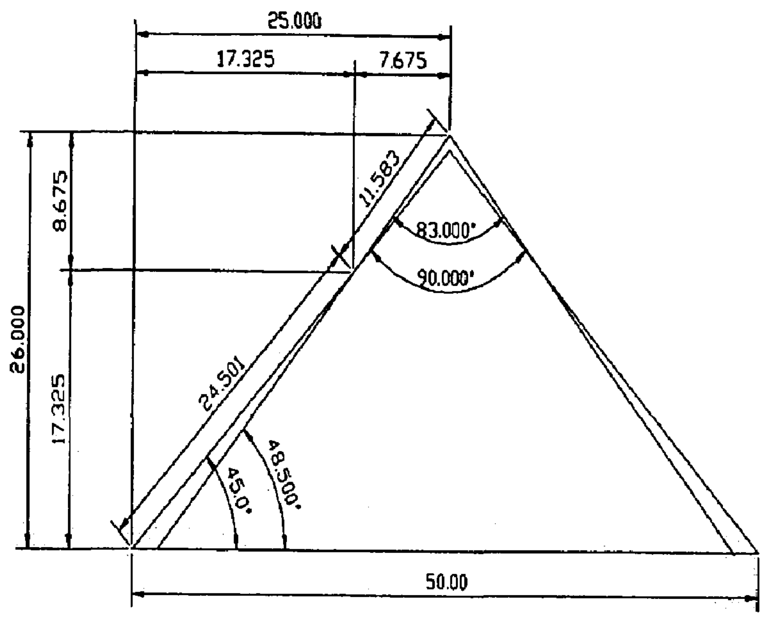
[FIG. 18b]
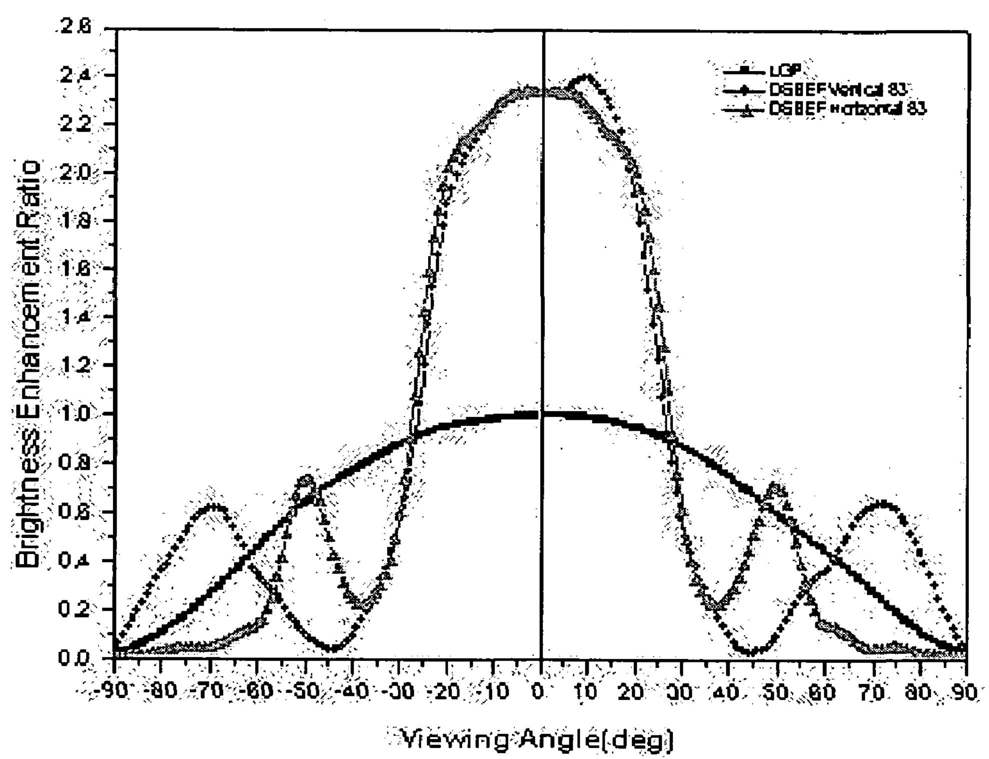

[FIG. 19a]
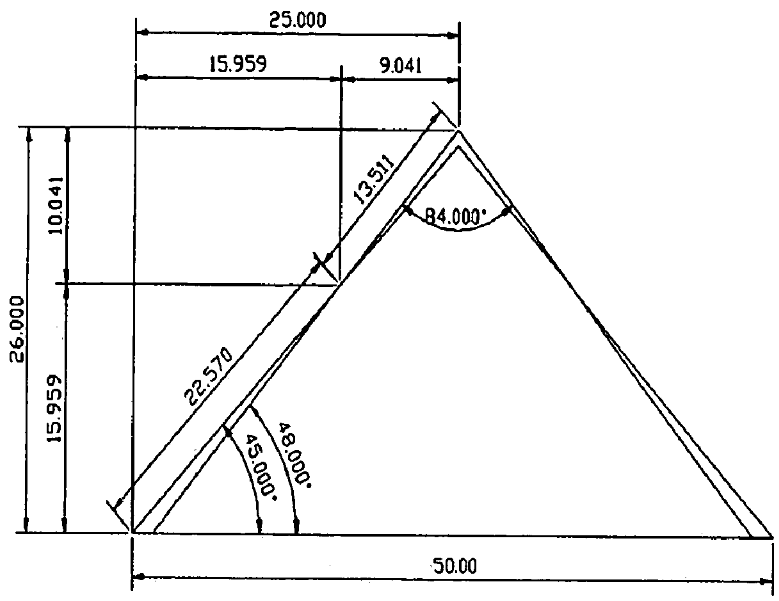
[FIG. 19b]
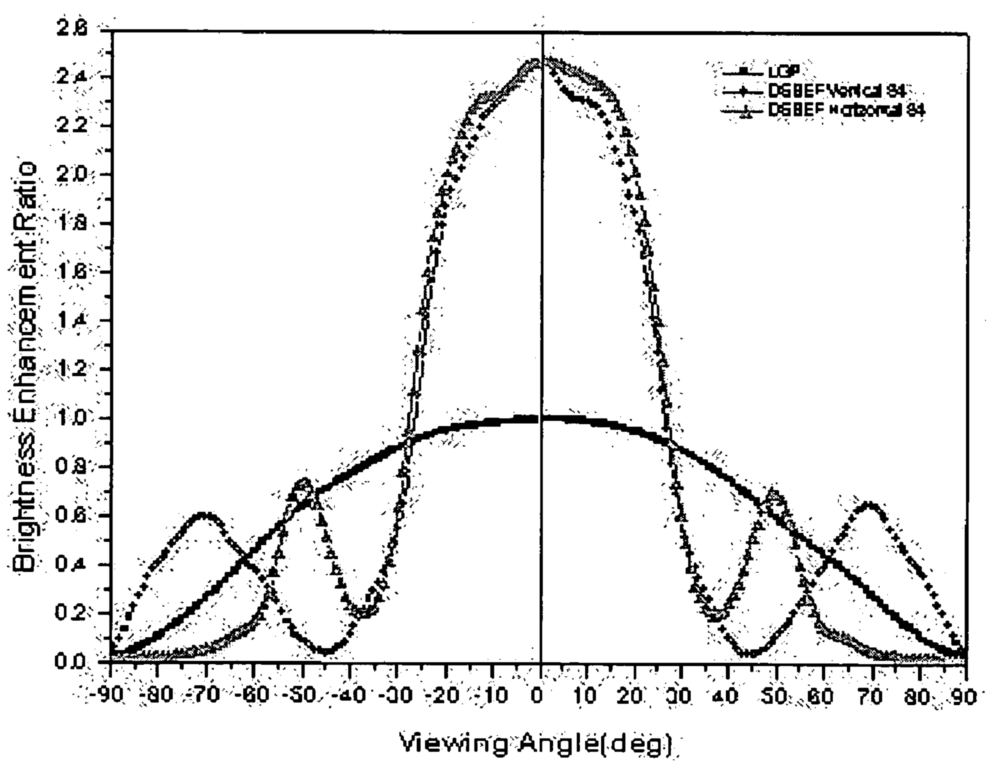

[FIG. 20a]
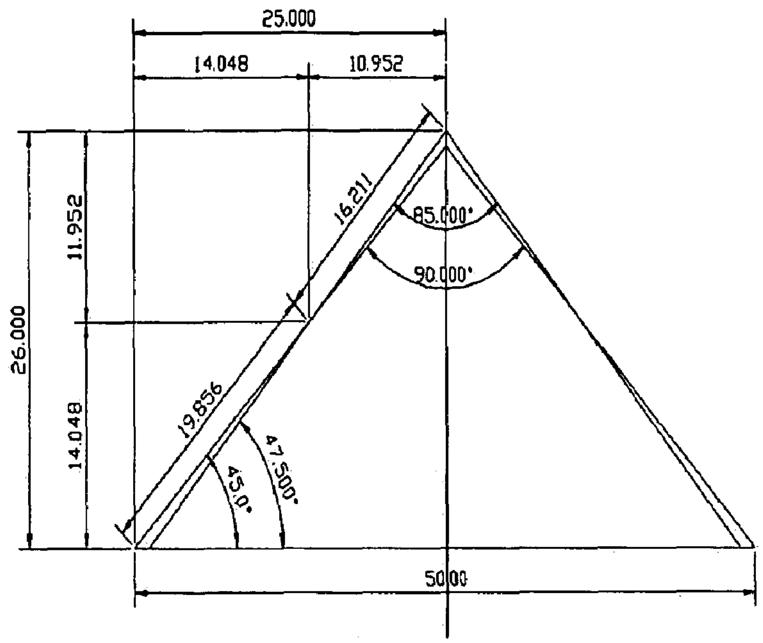
[FIG. 20b]
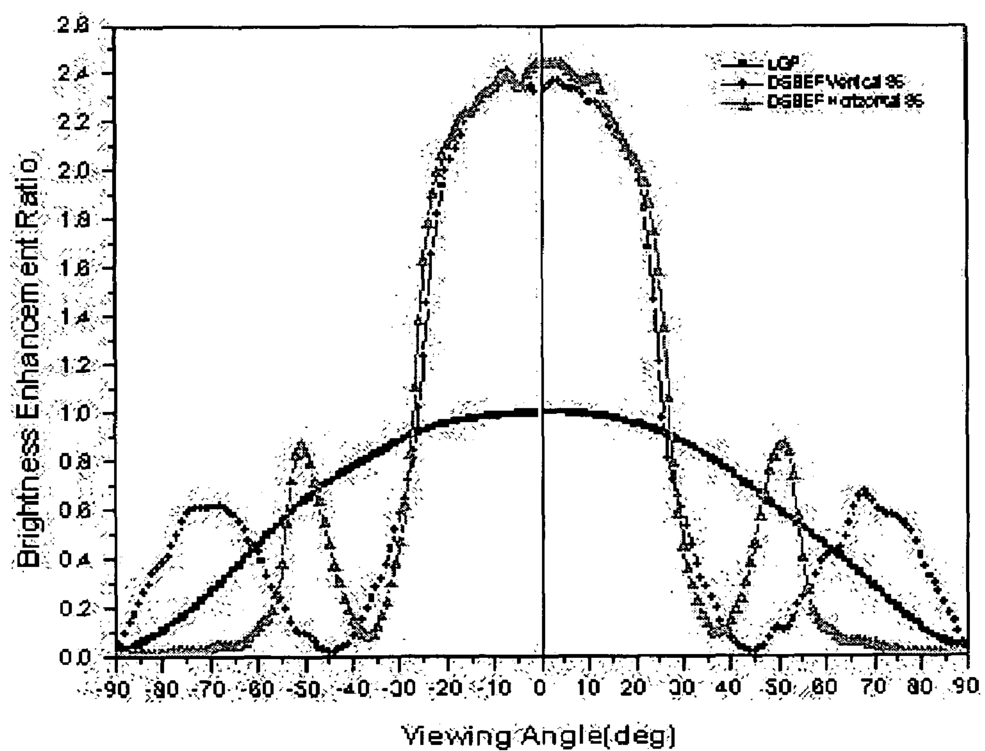

[FIG. 21a]
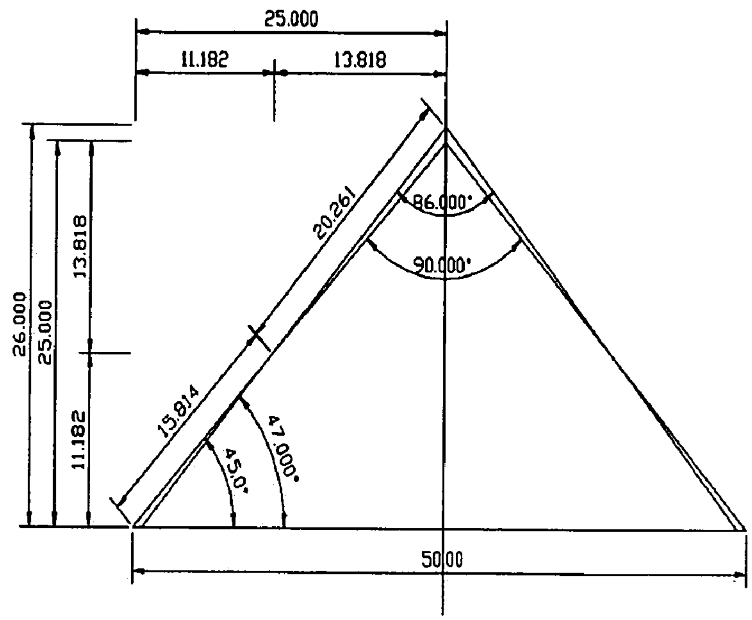
[FIG. 21b]
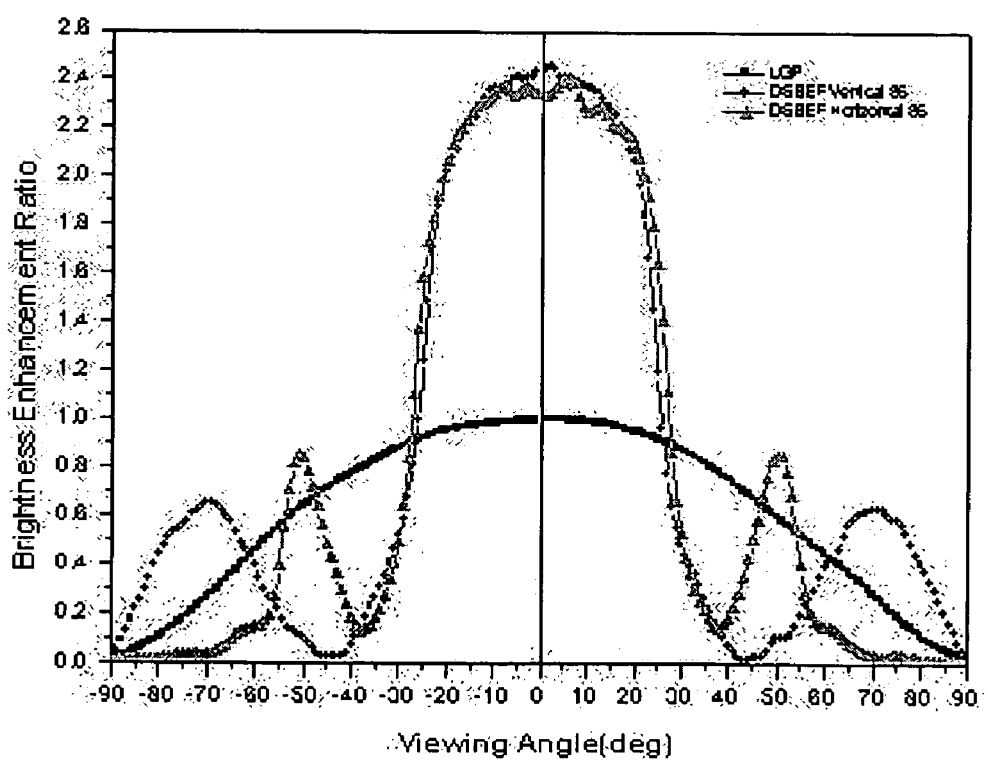

[FIG. 22a]
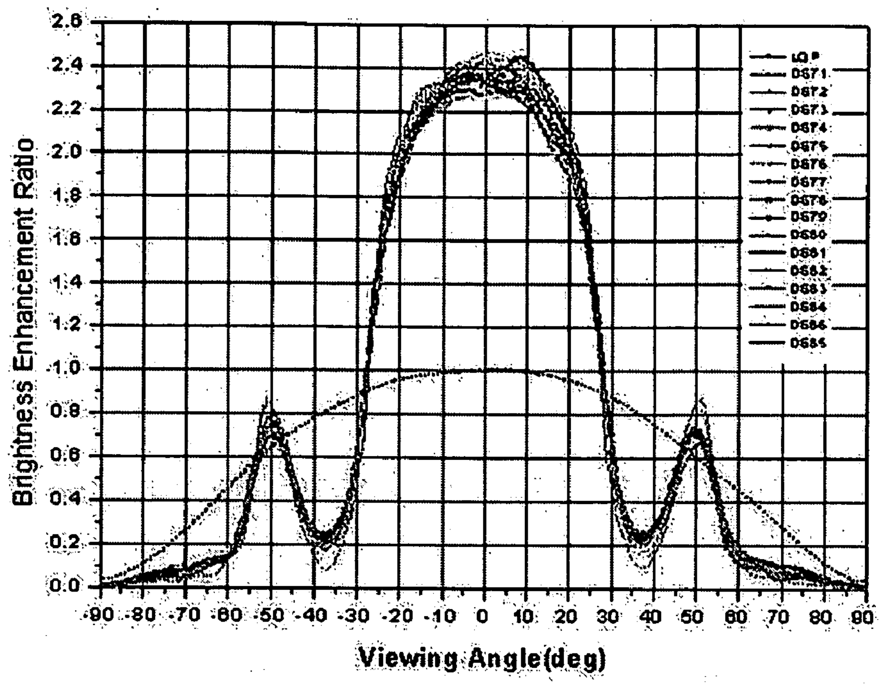
[FIG. 22b]
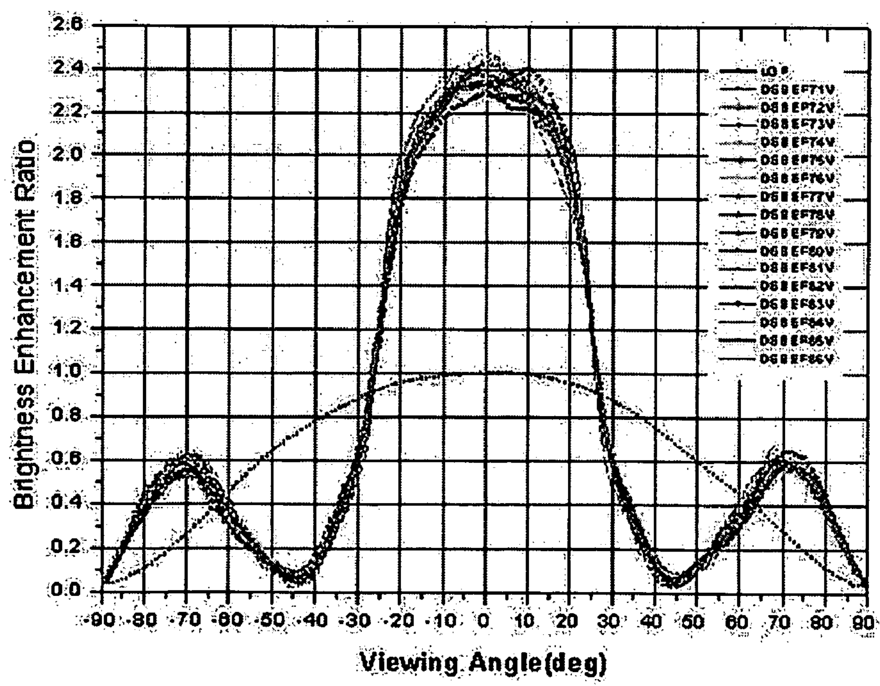

PRISM SHEET HAVING CONCAVE PENTAGONAL

CROSS REFERENCE TO RELATED APPLICATION

This application is a 35 USC § 371 National Phase Entry Application from PCT/KR2004/001933, filed Jul. 30, 2004, and designating the United States.

BACKGROUND OF INVENTION

1. Technical Field

The present invention relates to a prism sheet, and more particularly to a prism sheet in which each individual prism constituting a prism sheet has a concave pentagonal structure, thereby improving luminance and expanding the viewing angle thereof.

2. Background Art

A Liquid crystal display (hereinafter, referred to as a "LCD") is one of image display devices, and has quickly replaced other display devices such as a cathode ray tube (CRT) due to various advantages, for example, its thin thickness and low electric power consumption, as compared with other display devices. In contrasted with the CRT, the LCD does not spontaneously emit a light ray and thus needs a back light unit, in addition to a liquid crystal window.

Conventional backlight units are categorized generally into an underneath type, an edge type and a taper type. The underneath type comprises at least two lamps arranged in parallel at the lower part of a light guiding plate (will be hereafter described), and the edge type has two lamps, but which are provided at both sides of the light guiding plate respectively. In the taper type, a single lamp is provided at one side of the light guiding plate, the lower part of which is slanted. Accordingly, the energy consumption increases in the order of the taper type, the edge type and the underneath type.

FIG. 1 is a perspective exploded view of a conventional taper-type backlight unit. FIG. 2 illustrates a perspective view of the construction of a conventional prism sheet. As shown in FIGS. 1 and 2, a reflective plate 4, a light guiding plate 2, a diffusion plate 5, a lower prism sheet 6, an upper prism sheet 7, and a protection plate 8 are stacked in sequence above a mold frame 9. Although not illustrated, a liquid crystal panel is placed above and spaced apart from the protection plate 8. A lamp 1 is disposed at one side of the light guiding plate 2 and enclosed with a lamp reflector 3.

On the other hand, as shown in FIG. 2, the conventional backlight unit comprises the upper prism sheet 7 and the lower prism sheet 6, which are stacked one above the other. The lower prism sheet 6 consists of a plurality of elongated projections 6*a*, which are arranged in parallel. Each of elongated projection runs in the same direction and has a transversal cross-section of isosceles triangle, thereby forming a prism. Similarly, the upper prism sheet 7 has a plurality of elongated projections 7*a* thereon, which have the same configuration as the lower projections 6*a*, with exception that the upper and lower projections 6*a*, 7*a* are arranged perpendicularly to each other.

In the conventional backlight unit having the above-described construction, a light ray emitted from the lamp 1 passes the light guiding plate 2 directly or after reflected on the reflector 3, and then, via the diffusion plate 5 and the prism sheets 6 and 7, enters the liquid crystal panel, where resultantly a desired image is formed. At this time, the light ray emitted from the lamp 1 enters the light guiding plate without leaking outside by means of the reflector 5, and is uniformly scattered therein. The scattered light ray is made more uniform while passing the diffusion plate 5. The light ray emitting from the diffusion plate 5 is refracted at a specific angle when pass the prism sheets 6 and 7, and finally enters the liquid crystal panel. In particular, the light ray is uniformly aligned at the orientation of 90 or 180 degrees and amplified while passing the orthogonal projections 6*a*, 7*a* of the prism sheets 6, 7. The conventional backlight unit described above is exemplified by Koran Patent Publication No. 58166 (published on Jul. 5, 2001), and other type of backlight unit is disclosed in Korean Patent Publication No. 55377 (published on Jul. 4, 2003).

However, the conventional prism sheet is structured such that each individual prism has a cross-section of isosceles triangle, in which only two oblique sides (legs of the isosceles triangle) can make contribution to the increase in luminance, thereby resulting in a limited efficiency of increasing the luminance.

DISCLOSURE OF INVENTION

Therefore, the present invention has been made in order to solve the above problems in the prior art, and it is an object of the present invention to provide a prism sheet having a concave pentagonal structure, in which each prism has a shape of concave pentagon to provide additional faces which can make contribution to increase in luminance, thereby providing an improved luminance and a widened viewing angle.

To accomplish the above object, according to one aspect of the invention, there is provided a prism sheet having a concave pentagonal structure. The prism sheet comprises a base layer; and a prism array disposed on and supported by the base layer, the prism array consisting of a plurality of prisms aligned in parallel and one beside the other, wherein the transversal cross-section of each prism has a shape of concave pentagon, which is symmetrical about a vertical line passing the apex, and wherein the interior angle $\alpha$ of the apex is $30° \leqq \alpha \leqq 120°$, the exterior angle $\beta$ formed by the upper slant side and the lower slant side is $\beta < 180°$, the interior angle $\gamma$ of the lower vertex formed by the lower slant side and the base is $5° \leqq \gamma \leqq 85°$, and the length w of the base is $30\ \mu m \leqq w \leqq 100\ \mu m$.

Preferably, the interior angle $\alpha$ of the apex may be $40° \leqq \alpha \leqq 100°$, the exterior angle $\beta$ formed by the upper slant side and the lower slant side may be $160° \leqq \beta \leqq 179°$, and the interior angle $\gamma$ of the lower vertex formed by the lower slant side and the base may be $30° \leqq \gamma \leqq 60°$. Preferably, the length w of the base may be $40\ \mu m \leqq w \leqq 60\ \mu m$.

BRIEF DESCRIPTION OF DRAWINGS

Further objects and advantages of the invention can be more fully understood from the following detailed description taken in conjunction with the accompanying drawings in which:

FIG. 1 is a perspective exploded view of a conventional taper-type backlight unit;

FIG. 2 illustrates a perspective view of the construction of a conventional prism sheet;

FIG. 3 schematically illustrates a prism sheet having a concave pentagonal structure according to one embodiment of the invention;

FIG. 4 depicts a detailed structure of one prism in the prism sheet of FIG. 3;

FIG. 5 shows a simulation of light scattering path in the prism sheet according to the invention;

FIGS. 6*a* to 21*a* show a prism structure according to the invention, where the interior angle of the apex is incremented by one degree from 71° to 86°, and a relative distribution of luminance with respect to each viewing angle;

FIG. 22*a* is a graph collectively showing horizontal luminance distributions with respect to each viewing angle in the graphs of FIGS. 6*b* to 21*b*; and FIG. 22*b* is a graph collectively showing vertical luminance distributions with respect to each viewing angle in the graphs of FIGS. 6*b* to 21*b*.

BEST MODE FOR CARRYING OUT THE INVENTION

Referring to the accompanying drawings, the preferred embodiments according to the present invention are hereafter described in detail. Before illustrating details of the preferred embodiments of the invention, a brief explanation of the light refraction at an interface boundary of two materials having different indices of refraction will be provided below.

In general, when a light ray passes an interface boundary at an arbitrary angle, it is bent, i.e., a change in its travelling path occurs. This is called the refraction of light. The refraction principle is applied to a prism, which is used in a microscope, a binocular, a backlight unit or the like. The refraction of light takes place according to the Snell's law, which is expressed by the following equation where a light ray passes an interface boundary of material 1 and material 2 having a index of refraction $n_1$ and $n_2$ respectively and the incidence angle and refraction angle are $\theta_1$ and $\theta_2$ respectively.

$n_1 \sin \theta_1 = n_2 \sin \theta_2$

FIG. 3 schematically illustrates a prism sheet having a concave pentagonal structure according to one embodiment of the invention, where the prism sheet is generally denoted at a reference numeral 20. FIG. 4 depicts a detailed structure of one prism in the prism sheet of FIG. 3. As shown in FIGS. 3 and 4, the prism sheet 20 of the invention comprises a base layer 22 and a prism array 24 placed thereon. The prism array 24 consists of a plurality of prisms, which are aligned one beside another and in parallel. The prism array 24 is supported by the base layer 22.

As illustrated in FIG. 4, the transversal cross-section of each prism is formed of a concave pentagonal configuration, which is generally denoted by a reference numeral 24. The concave pentagonal structure of the invention can be explained with reference to an isosceles triangle cross section of conventional prism. That is, each leg of isosceles triangle is bent inward in such a manner that the inward bending forms an additional vertex, which is a bending point lb, rb dividing the leg into a upper leg $\mathbf{24}_{us}$ and a lower leg $\mathbf{24}_{us}$ (also, referred to as a "upper and lower slant side), thereby configuring a concave pentagon. In this pentagonal structure of prism, the sum of interior angles is 540°, regardless of a degree of inward bending. It is preferred that the pentagonal structure of the invention is symmetrical about a vertical line passing the apex a of the pentagon.

According to the invention, in the concave pentagonal cross-section of the prism, the interior angle α of the apex a is $30° \leqq \alpha \leqq 120°$, preferably $40° \leqq \alpha \leqq 100°$. An exterior angle formed by the upper slant side $\mathbf{24}_{us}$ and the lower slant side $\mathbf{24}_{us}$, i.e., the exterior angle β of the bending point lb and rb is $\beta < 180°$, preferably $160° \leqq \beta \leqq 179°$. The interior angle γ of the lower vertex lc, rc formed by the lower slant side $\mathbf{24}_{ls}$ and the base 24*w* is $5° \leqq \gamma \leqq 85°$, preferably $30° \leqq \gamma \leqq 60°$. The length w of the base 24*w* is 15 $\mu m \leqq w \leqq 100$ μm, preferably 40 $\mu m \leqq w \leqq 60$ μm.

FIG. 5 shows a simulation of light scattering path in the prism sheet according to the invention. As illustrated in FIG. 5, the prism sheet of the invention has a total of four refraction faces so that a wide viewing angle can be realized, along with an improved luminance. That is, the upper leg (slant face) renders an incident light to be bent or refracted in a vertical direction, thereby making contribution to improvement in the luminance, and the lower leg (slant face) makes the incident light be spread in a horizontal direction, thereby providing for a widened viewing angle.

FIGS. 6*a* to 21*a* show a prism structure according to the invention, where the length of the base, the height of the prism and the interior angle γ of the lower vertex are fixed to 50 μm, 26 μm, and 45° respectively, and the interior angle α of the apex a is incremented by one degree from 71° to 86°.

FIGS. 6*a* to 21*a* also illustrate a relative distribution of luminance with respect to each viewing angle in the above-described prism structure. In the experiments of FIGS. 6*a* to 21*a*, SPEOS (trademark, supplied by OPTIS, France) is used. Furthermore, each resultant distribution graph of FIGS. 6*a* to 21*b* shows a relative luminance distribution scanned in a horizontal and vertical direction, where two prism sheets of the invention are employed, placing them vertically to each other. The luminance is a relative value to a reference value 1, where only a single sheet of light guiding plate made of polymethyl methacrylate (PMMA) is used.

FIG. 22*a* is a graph collectively showing horizontal luminance distributions in terms of relative values, with respect to each viewing angle in the graphs of FIGS. 6*b* to 21*b*. FIG. 22*b* is a graph collectively showing vertical luminance distributions with respect to each viewing angle in the graphs of FIGS. 6*b* to 21*b*. The maximum luminance values and the maximum relative values in the graphs of FIGS. 6*b* to 21*b* are summarized in the following table 1.

TABLE 1

| | Maximum Luminance Value | Maximum Relative Value |
|---|---|---|
| Light Guide Panel Only | 0.333233 | 1 |
| Conventional Triangle Prism | 0.513272 | 1.58 |
| The invention (α = 71°) | 0.787870 | 2.37 |
| The invention (α = 72°) | 0.774849 | 2.33 |
| The invention (α = 73°) | 0.774612 | 2.34 |
| The invention (α = 74°) | 0.812868 | 2.44 |
| The invention (α = 75°) | 0.806116 | 2.42 |
| The invention (α = 76°) | 0.753511 | 2.26 |
| The invention (α = 77°) | 0.791157 | 2.38 |
| The invention (α = 78°) | 0.759934 | 2.28 |
| The invention (α = 79°) | 0.778343 | 2.33 |
| The invention (α = 80°) | 0.765696 | 2.30 |
| The invention (α = 81°) | 0.769455 | 2.31 |
| The invention (α = 82°) | 0.784998 | 2.36 |
| The invention (α = 83°) | 0.780085 | 2.34 |
| The invention (α = 84°) | 0.821674 | 2.47 |
| The invention (α = 85°) | 0.776861 | 2.33 |
| The invention (α = 86°) | 0.812238 | 2.44 |

As understood from the above table 1, the relative luminance value of the prism sheet having a concave pentagonal structure of the present invention is considerably increased more than 2.2 to 2.5 times, as compared with the case where only a light guiding plate is employed. Furthermore, the relative luminance value is increased, as compared with a conventional prism sheet, for example, having an isosceles triangle structure.

The following table 2 shows a luminance value of a backlight unit for the use in a LCD display device of cellular phones, in cases where two prim sheets of the present invention are employed with installed perpendicularly to each other, and a conventional isosceles triangle prism sheet is used.

TABLE 2

| | Minimum Value | Maximum Value | Average Value |
|---|---|---|---|
| Conventional Triangle Prism | 5400.139844 | 15121.79844 | 8041.159734 |
| The invention ($\alpha = 60°$) | 8750.1377 | 23051.0567 | 11822.256 |
| The invention ($\alpha = 65°$) | 8712.994 | 22704.757 | 11855.658 |
| The invention ($\alpha = 70°$) | 8569.271 | 22710.97 | 11945.199 |
| The invention ($\alpha = 75°$) | 8712.264 | 22960.995 | 11848.111 |
| The invention ($\alpha = 80°$) | 8643.641 | 22905.015 | 11837.592 |
| The invention ($\alpha = 85°$) | 8632.468 | 22491.008 | 11765.966 |
| The invention ($\alpha = 86°$) | 8754.375 | 22331.111 | 11763.244 |
| The invention ($\alpha = 87°$) | 8439.195 | 22245.92 | 11718.57948 |

It is understood from the above table 2 that, as compared with a conventional prism sheet having a isosceles triangle structure, the prism sheet having a concave pentagonal structure of the present invention shows an improved luminance with respect to all the minimum, maximum and average values in the range of 60° to 87° of the interior angle $\alpha$ of the apex a.

INDUSTRIAL APPLICABILITY

As described above, the prism sheet having a concave pentagonal structure according to the invention provides for an improved luminance and a widened viewing angle. Therefore, when the present invention is applied to a backlight unit for a display device of various mobile communication terminals, TV and the like, the fatigue of user's eye can be considerably alleviated, and the deterioration of luminous efficiency due to the use of a polarizing file can be minimized, thereby providing an extended life of the backlight unit. In addition, the underneath-type backlight used in the LCD television can possibly be replaced by an edge type by applying the present invention thereto, therefore reducing the manufacturing cost of LCD television.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention. For example, the present invention may be applied to a self-luminous organic electroluminiscence display in order to improve the luminance of backlight. Also, the prism sheet of the invention can be employed as a light guiding plate. Furthermore, the present invention can be applied to a self-reflecting film used in a light reflector of a road guide rail, a road central line, and a vehicle, or the like.

What is claimed is:

1. A prism sheet having a concave pentagonal structure, the prism sheet comprising:

a base layer; and a prism array disposed on and supported by the base layer, the prism array consisting of a plurality of prisms aligned in parallel and one beside the other, wherein the transversal cross-section of each prism has a shape of concave pentagon, which is symmetrical about a vertical line passing the apex, and wherein the interior angle $\alpha$ of the apex is $30° \leqq \alpha \leqq 120°$, the exterior angle $\beta$ formed by the upper slant side and the lower slant side is $\beta < 180°$, the interior angle $\gamma$ of the lower vertex formed by the lower slant side and the base is $5° \leqq \gamma \leqq 85°$, and the length w of the base is $30\ \mu m \leqq w \leqq 100\ \mu m$.

2. A prism sheet according to claim 1, wherein the interior angle $\alpha$ of the apex is $40° \leqq \alpha \leqq 100°$, the exterior angle $\beta$ formed by the upper slant side and the lower slant side is $160° \leqq \beta \leqq 179°$, and the interior angle $\gamma$ of the lower vertex formed by the lower slant side and the base is $30° \leqq \gamma \leqq 60°$.

3. A prism sheet according to claim 1, wherein the length w of the base is $40\ \mu m \leqq w \leqq 60\ \mu m$.

4. A prism sheet having a concave pentagonal structure, the prism sheet comprising:

a base layer; and a prism array disposed on and supported by the base layer, the prism array consisting of a plurality of prisms aligned in parallel and one beside the other, wherein the transversal cross-section of each prism has a shape of concave pentagon, which is symmetrical about a vertical line passing an apex, and wherein the length w of the base is $15\ \mu m \leqq w \leqq 100\ \mu m$.

5. A prism sheet according to claim 4, wherein the interior angle $\alpha$ of the apex is $30° \leqq \alpha \leqq 120°$, the exterior angle $\beta$ formed by the upper slant side and the lower slant side is $\beta < 180°$, and the interior angle $\gamma$ of the lower vertex formed by the lower slant side and the base is $5° \leqq \gamma \leqq 85°$.

6. A Prism sheet according to claim 4, wherein the length w of the base is 50 μm, the height h from the base to the apex is 26 μm, and the interior angle $\gamma$ of the lower vertex formed by the lower slant side and the base is 45°, and the interior angle of the apex is $60° \leqq \alpha \leqq 87°$.

7. A prism sheet according to claim 2, wherein the length w of the base is $40\ \mu m \leqq w \leqq 60\ \mu m$.

* * * * *